US009125025B2

(12) United States Patent
Niemi

(10) Patent No.: US 9,125,025 B2
(45) Date of Patent: Sep. 1, 2015

(54) WIRELESS COMMUNICATION SYSTEM AND METHOD

(71) Applicant: Broadcom Corporation, Irvine, CA (US)

(72) Inventor: Marko Tapani Niemi, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 58 days.

(21) Appl. No.: 13/972,110

(22) Filed: Aug. 21, 2013

(65) Prior Publication Data

US 2014/0057642 A1   Feb. 27, 2014

(30) Foreign Application Priority Data

Aug. 21, 2012   (GB) .................................. 1214904.3

(51) Int. Cl.
*H04W 16/10*   (2009.01)
*H04W 4/06*   (2009.01)
*H04L 29/06*   (2006.01)
(Continued)

(52) U.S. Cl.
CPC .............. *H04W 4/06* (2013.01); *H04L 63/104* (2013.01); *H04W 8/186* (2013.01); *H04W 12/08* (2013.01); *H04W 4/08* (2013.01); *H04W 48/08* (2013.01); *H04W 84/045* (2013.01)

(58) Field of Classification Search
CPC .................... H04W 36/0083; H04W 36/0061; H04W 48/18; H04W 72/082; H04W 16/10
USPC ................................ 455/452.1, 434, 436, 456
See application file for complete search history.

(56) References Cited

U.S. PATENT DOCUMENTS

2008/0220782 A1   9/2008   Wang et al.
2008/0227447 A1   9/2008   Jeong et al.
(Continued)

FOREIGN PATENT DOCUMENTS

EP        2 373 095 A1   10/2011

OTHER PUBLICATIONS

3GPP TS 23.003 v11-2A Technical Specification, 3$^{rd}$ Generation Partnership Project; Technical Specification Group Core Network and Terminals; Numbering, addressing and identification (Release 11), Jun. 2012 (83 pages).

(Continued)

*Primary Examiner* — Kashif Siddiqui
*Assistant Examiner* — Obidon Bassinan
(74) *Attorney, Agent, or Firm* — Foley & Lardner LLP; Christopher J. McKenna; Paul M. H. Pua

(57) ABSTRACT

A device and method arranged to control access to resources of a communication network by a User Equipment (UE). One embodiment includes an apparatus for a user equipment for use in controlling access to resources of a communication network, the apparatus including a processing system arranged to cause the apparatus to: monitor for a change in a state of association between a Closed Subscriber Group (CSG) cell and the user equipment, said CSG cell having a Public Land Mobile Network Identity (PLMN ID) and a CSG Identity (CSG ID) associated therewith; and in response to a said change, communicate data indicative of the change, of said CSG ID and of said PLMN ID, for receipt by a Universal Integrated Circuit Card (UICC) associated with the user equipment, whereby to enable the UICC to control access to resources of said CSG cell.

20 Claims, 5 Drawing Sheets

(51) Int. Cl.
*H04W 12/08* (2009.01)
*H04W 8/18* (2009.01)
*H04W 48/08* (2009.01)
*H04W 4/08* (2009.01)
*H04W 84/04* (2009.01)

(56) References Cited

U.S. PATENT DOCUMENTS

2010/0291927 A1* 11/2010 Wu et al. .................... 455/435.3
2011/0051597 A1* 3/2011 Cohen et al. .................. 370/221
2012/0115477 A1* 5/2012 Ali et al. .................... 455/435.1
2012/0157095 A1 6/2012 Fodor et al.

OTHER PUBLICATIONS

3GPP TS 31.101 v10.0.1., Technical Specification, 3rd Generation Partnership Project; Technical Specification Group Core Network and Terminals; UICC-terminal interface; Physical and logical characteristics (Release 10), Jun. 2011 (35 pages).

3GPP TS 31.102 v11.2.0, Technical Specification, 3rd Generation Partnership Project; Technical Specification Group Core Network and Terminals; Characteristics of the Universal Subscriber Identity Module (USIM) application (Release 11), Jun. 2012 (228 pages).

3GPP TS 31.111 v11.2.0, Technical Specification, 3rd Generation Partnership Project; Technical Specification Group Core Network and Terminals; Universal Subscriber Identity Module (USIM) Application Toolkit (USAT) (Release 11), Jun. 2012 (123 pages).

Samsung, "36.304 correction on CGS membership check," 3GPF TSG-RAN WG2 Meeting #73, R2-111309, Taipei, Taiwan, Feb. 2011 (7 pages).

Qualcomm Incorporated, "Correction of CSG ID list identifier," 3GPP TSG-CT6 Meeting #65, C6-120325, Helsinki, Finland, Aug. 20-23, 2012 (2 pages).

Qualcomm Incorporated, "Correction of CSG ID list identifier," 3GPP TSG-CT6 Meeting #65, C6-120326, Helsinki, Finland, Aug. 20-23, 2012 (2 pages).

Qualcomm Incorporated, "Correction of CSG ID list identifier," 3GPP TSG-CT6 Meeting #65, C6-420327, Helsinki, Finland, Aug. 20-23, 2012 (2 pages).

Qualcomm Incorporated & Comprion, "Correction of test sequence for Provide Local Information, Discovery of surrounding CSG cells," 3GPP TSG-CT6 Meeting #65, C6-120332, Helsinki, Finland, Aug. 20-23, 2012 (3 pages).

UKIPO Search Report under Sections 17(5) dated Dec. 4, 2012 issued in a related UK Application No. GB1214904.3 (4 pages).

UKIPO Examination Report under Sections 18(3) dated Dec. 12, 2012 issued in a related UK Application No. GB1214904.3 (3 pages).

* cited by examiner

WIRELESS COMMUNICATION SYSTEM AND METHOD

CROSS REFERENCE TO RELATED APPLICATION

This application claims the benefit under 35 U.S.C. §1.19 (a) and 37 CFR §1.55 to UK Patent Application No. GB1214904.3, fled on Aug. 21, 2012, the entire disclosure of which is incorporated herein by reference.

TECHNICAL FIELD

The present invention relates to wireless communication systems, methods, devices and computer programs, and more specifically relates to controlling access to resources of a communication network by a user equipment. Embodiments provide a mechanism for controlling access to resources of a cell.

BACKGROUND INFORMATION

The following meanings for the abbreviations used in this specification apply:
CN core network
CSG closed subscriber Group
HeNB home enhanced node B
HeNodeB home enhanced node B
HNodeB home node B
HNB home node B
MME mobility management entity
NW Network
PLMN public land mobile network
RNC radio network controller
RRC radio resource control
SAT SIM application toolkit
SI System Information
SIM subscriber identity module
SIB System Information Block
UE user equipment
UICC universal integrated circuit card
USAT USIM application toolkit
USIM universal subscriber identity module In the E-UTRAN system there are conventional network access nodes/cells termed eNodeBs which serve all users, and also subscriber group Closed Subscriber Group (CSG) cells such as home eNodeBs which are available for traffic (voice and/or data) to only those subscribers registered with the CSG and possibly also certain allowed guests. Any given CSG may include a group of cells (such as a corporate or university campus) or a single cell. CSGs may allow traffic access for non-subscribers for emergency calls or routine, non-emergency access.

CSG cells are identified by a CSG identity (CSG ID) within a Public Land Mobile Network (PLMN). When a wireless transmit/receive unit or a user equipment (UE) accesses such a CSG cell, a network node, such as the Mobility Management Entity (MME), checks that the CSG ID of the CSG cell corresponds to a CSG ID in the CSG subscription data of the UE, and that the relevant validity criteria are met.

Furthermore, every time a UE enters or leaves the coverage area of a CSG cell or camps with it, it notifies a Universal Integrated Circuit Card (UICC) associated therewith in order to access a relevant application or applet on a Subscriber Identity Module (SIM), Universal Subscriber Identity Module (USIM), IP multimedia Services Identity Module (ISIM) or CDMA Subscriber Identity Module (CSIM) maintained on the UICC In particular, the notification is communicated by means of a SIM/USIM/ISIM/CSIM application toolkit envelope command of the type 'event download—CSG cell selection', and in response to receiving this notification, the UICC triggers any associated applications or applets for controlling access to the CSG cell, which may, for example, include accessing or releasing the resources of the CSG cell. Alternatively, the UICC may use this notification to monitor an operational state associated with the UE, which may, for example, be for checking compliance. The 'event download—CSG cell selection' inter alia communicates the CSG ID corresponding to the CSG cell and a selection status, Le, whether the user equipment is in the coverage of the CSG cell or whether it is camped on it.

As described above, a CSG ID uniquely identifies a CSG cell within a PLMN; in cases where the UE has access to a plurality of PLMNs, the identification of the CSG cell by the UICC can be arbitrary, and can affect operation of the applets and applications associated with the 'event download—CSG cell selection' command.

Some embodiments are directed towards providing an improved CSG cell selection notification mechanism.

SUMMARY

In a first exemplary embodiment of the invention there is provided an apparatus for a user equipment for use in controlling access to resources of a communication network, the apparatus including a processing system, which may be embodied as at least one processor and at least one memory including computer program code, the at least one memory and the computer code, being configured to, with the at least one processor, cause the apparatus at least to: monitor for a change in a state of association between a Closed Subscriber Group (CSG) cell and the user equipment, said CSG cell having a Public Land Mobile Network Identity (PLMN ID) and a CSG Identity (CSG ID) associated therewith; and in response to a said change, communicate data indicative of the change, and of said CSG ID and said PLMN ID, for receipt by a Universal Integrated Circuit Card (UICC) associated with the user equipment, whereby to enable the UICC to control access to resources of said CSG cell, wherein said data indicative of said CSG ID and said PLMN ID are communicated via an envelope command of the type 'Event Download—CSG Cell Selection'.

In a second exemplary embodiment of the invention there is provided a method of controlling access to resources of a communication network by a user equipment, the method including causing the user equipment to: monitor for a change in a state of association between a Closed Subscriber Group (CSG) cell and the user equipment, said CSG cell having a Public Land Mobile Network Identity (PLMN ID) and a CSG Identity (CSG ID) associated therewith; and in response to a said change, communicate data indicative of the change, and of said CSG ID and said PLMN ID, for receipt by a Universal Integrated Circuit Card (UICC) associated with the user equipment, whereby to enable the UICC to control access to resources of said CSG cell, wherein said data indicative of said CSG ID and said PLMN ID are communicated via an envelope command of the type 'Event Download—CSG Cell Selection'.

The first and second exemplary embodiments are most conveniently implemented in a user equipment. Some embodiments also include a non-transitory computer-readable storage medium including a set of instructions, which, when executed by a user equipment, cause the user equipment to perform a method according to the second embodiment.

In a third exemplary embodiment of the invention there is provided an apparatus for use in controlling access to resources of a communication network by a user equipment, the apparatus including a subscriber identity module associated with the user equipment and a processing system arranged to cause the apparatus to: receive data indicative of a change in a state of association between a Closed Subscriber Group (CSG) cell and the user equipment, and data indicative of a CSG ID and a PLMN ID associated with said CSG cell, wherein said data indicative of a CSG ID and a PLMN ID associated with said CSG cell are received in an envelope command of the type 'Event Download—CSG Cell Selection'; and use said subscriber identity module to control access to resources of said CSG cell on the basis of said received PLMN ID.

In a fourth exemplary embodiment there is provided a method of controlling access to resources of a communication network by a user equipment, the method including: receiving data indicative of a change in a state of association between a Closed Subscriber Group (CSG) cell and the user equipment, and data indicative of a CSG ID and a PLMN ID associated with said CSG cell, wherein said data indicative of a CSG ID and a PLMN ID associated with said CSG cell are received in an envelope command of the type 'Event Download—CSG Cell Selection'; and using a subscriber identity module associated with said user equipment to control access to resources of said CSG cell on the basis of said received PLMN ID.

The third and fourth exemplary embodiments are most conveniently implemented in a universal integrated circuit card. Some embodiments also include a non-transitory computer-readable storage medium including a set of instructions, which, when executed by a universal integrated circuit card, cause the universal integrated circuit card to perform a method according to the fourth embodiment.

Further features and advantages of the invention will become apparent from the following description of some embodiments of the invention, given by way of example only, which is made with reference to the accompanying drawings.

DETAILED DESCRIPTION

Embodiments are concerned with improving Closed Subscriber Group (CSG) cell selection notification mechanism by a user equipment (UE) to a Universal Intergrated Circuit Card (UICC) maintaining an application, such as a Subscriber Identity Module (SIM), a Universal Subscriber Identity Module (USIM), IP multimedia Services Identity Module (ISIM) or CDMA Subscriber Identity Module (CSIM), corresponding to the UE, whereby to enable efficient access to resources of a CSG cell, for example.

In the following, examples and embodiments of the present invention are described with reference to the drawings. For illustrating the present invention, the examples and embodiments will be described in connection with a cellular communication network based on a 3GPP-type cellular system, such as universal mobile telecommunication system. However, it is to be noted that the present invention is not limited to an application using such types of communication system, but is also applicable in other types of communication systems and the like.

Figure 1:
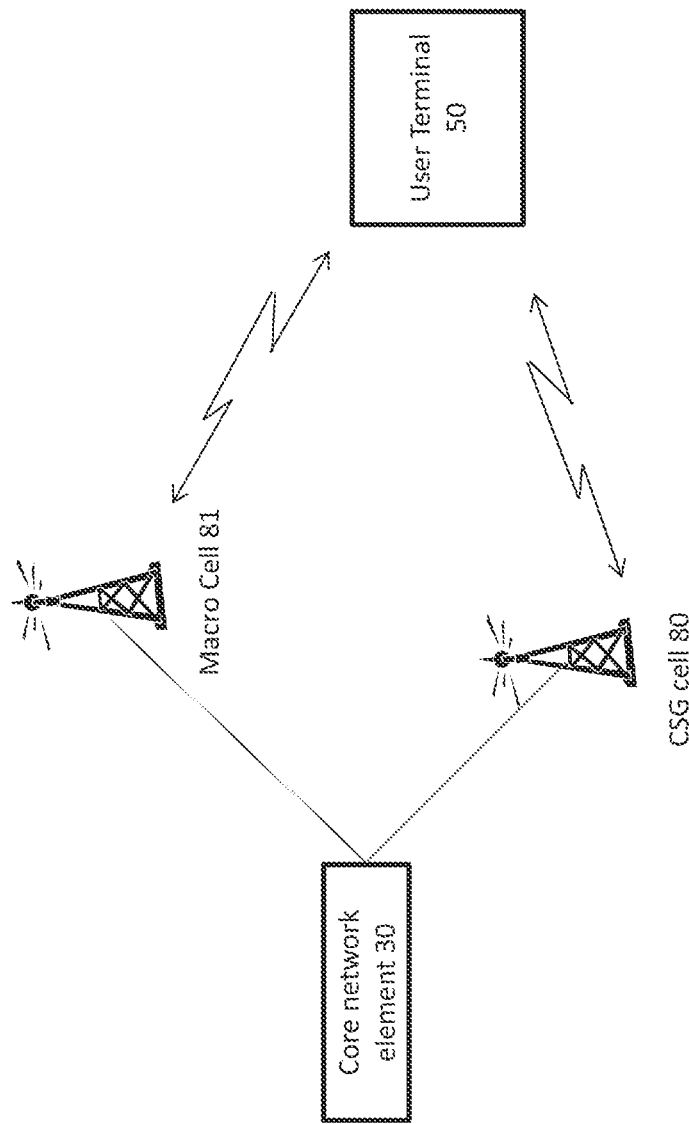
FIG. 1 is a simplified block diagram of a communication network within which some embodiments operate.

A basic system architecture of a communication network where some examples of embodiments of the invention are applicable may include a commonly known architecture of one or more communication networks including a wired or wireless access network subsystem and a core network. An example communication network, which may be a GSM EDGE Radio Access Network (GERAN), an Universal Terrestrial Radio Access Network (UTRAN) or an Enhanced Universal Terrestrial Radio Access Network (E-UTRAN), will now be described with reference to FIG. 1. The communication network 10 may include a macro cell 81 or Node B 81, and a core network element 30, such as a radio network controller (RNC). A UE 50 or another wireless transmit/receive device having a similar function–such as a modem chipset, a chip, a module etc., which can also be part of a UE or attached as a separate element to a UE, or the like, is able to communicate with the Node B 81 via one or more channels for transmitting several types of data.

The UE 50 is additionally able to communicate with a CSG cell 80 via one or more channels for transmitting several types of data. The CSG cell 80 has a CSG Identity (CSG ID) and an identity (PLMN ID) of a Public Land Mobile Network (PLMN) associated therewith. The CSG ID and the PLMN ID may be communicated to the UE 50 by, for example, the core network element 30 or a serving cell, such as the Node B 81, in a neighbourhood advertisement system information message, or by the CSG cell 80. While only one CSG cell is shown, in practice there may be many CSG cells from different PLMNs which are accessible to the UE 50.

The UE 50 typically includes a UICC 20 including an application, such as a SIM, a USIM, a ISIM or a CSIM. As is well known in the art, the SIM, the ISIM, the CSIM and the USIM include applications and applets for use in controlling the operation of the UE 50, which may, for example, establish access to resources of the CSG cell 80 and cause the UE 50 to be authenticated with the CSG cell 80 or the network 10.

The communication network 10 may additionally be in communication with various mobility management entities (not shown), which facilitate mobility of UEs across various carriers, and/or network management entities, which manage resources of the communication network.

The general functions and interconnections of the described elements, which also depend on the actual network type, are known to those skilled in the art and described in corresponding specifications, so that a detailed description thereof is omitted herein. However, it is to be noted that several additional network elements and signalling links may be employed for a communication connection to or from UEs, Node Bs, CSG cells or core network elements, besides those described in detail herein below.

Figure 2:
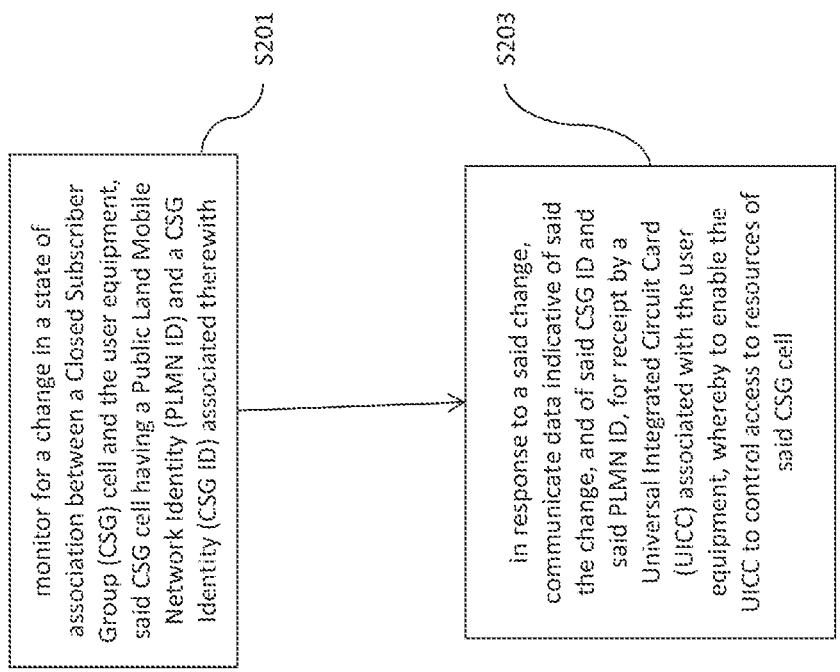
FIG. 2 is a logic flow diagram that illustrates the operation of a method, and a result of execution of computer program instructions embodied on a computer readable memory, from the perspective of a user equipment, according to some embodiments.
Figure 3:
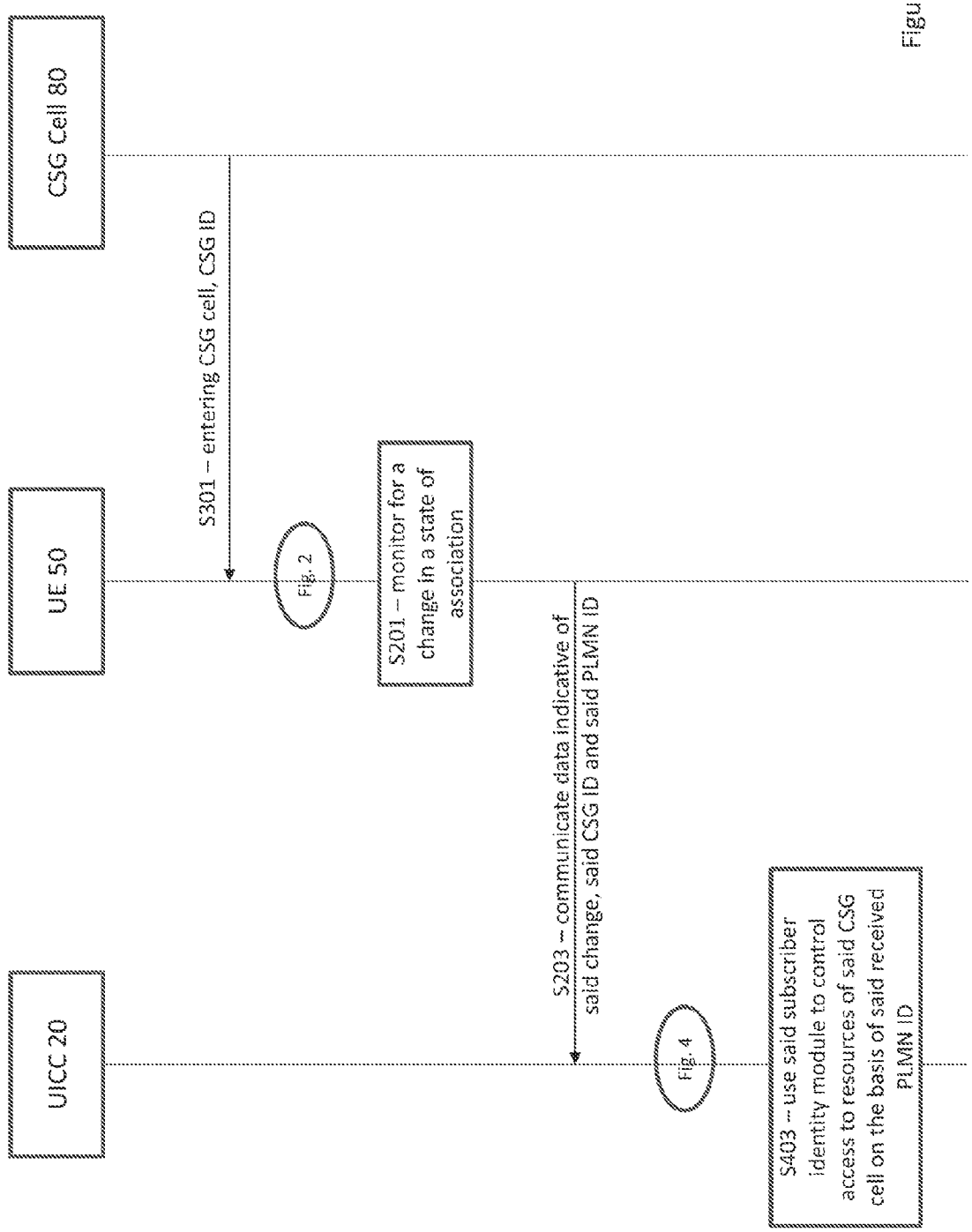
FIG. 3 is a flow diagram that illustrates the various steps performed by UICC, UE and CSG cell according to some embodiments.

Referring to FIGS. 2 and 3, in accordance with an example embodiment, the UE 50 monitors for a change in a state of association between the CSG cell 80 and the UE 50 (step 201). The state of association may, for example, indicate that the UE 50 has entered the serving area of the CSG cell 80 (step 301), the UE 50 has left the serving area of the CSG cell 80, the UE 50 is being served by the CSG cell 80, the UE 50 has registered with the CSG cell, the UE 50 has been rejected for service in the CSG cell or the UE 50 is camped on the CSG cell 80, In response to a change in the state of association, the UE 50 communicates data indicative of the change (hereinafter 'change notification'), of the CSG ID and of the PLMN ID for receipt by the UICC 20 (step 203).

As will be explained further below, the UICC 20 includes an application, which may, for example be the SIM, USIM, ISIM or CSIM, associated with the UE 50. In response to receiving the change notification, the UICC uses the application to control access to resources of the CSG cell 80 on the basis of the PLMN ID received with the change notification. In particular, the UICC 20 may use an application or applet on the SIM, USIM, ISIM or CSIM to access or release resources of the CSG cell 80. For example, the UICC 20 may authenticate the UE 50 to the CSG cell 80 or network 10 in order to access resources of the CSG cell 80, establish a channel for communication with the CSG cell 80 or release a communication channel established with the CSG cell 80. In an alternative arrangement, the UICC 20 may maintain access to the CSG cell 80 in response to receiving the change notification, or may monitor an operational state associated with the UE 50 on the basis of the change notification.

According to an example previously known technique, at the equivalent of step S203, UICCs were provided with CSG IDs for use in identification of a corresponding CSG cell. When the UE 50 had access to a plurality of PLMNs, each of which has e.g. a CSG cell with the same CSG identity as that of a different CSG cell in another PLMN, identification of a CSG cell on the basis of CSG ID alone could be misleading. The inventor has identified a previously unidentified problem with such previous mechanisms as regards the operation of the UE 50 and the UICC 20, namely that such conventional techniques may lead to arbitrary selection of a given CSG.

Accordingly, some embodiments provision the PLMN ID corresponding to the CSG cell 80 alone with its CSG ID so as to enable the UICC 20 to unambiguously identify a particular CSG cell 80. This advantageously eliminates the requirement for the UICC 20 to execute potentially resource intensive prediction algorithms, which, in any event, may not correctly identify which of the plurality of PLMNs the particular CSG cell is actually associated with.

In at least some arrangements, the UE 50 may communicate the change notification via a SIM Application Toolkit (SAT)/USIM Application Toolkit (USAT)/ISIM Application Toolkit (ISAT)/CSIM Application Toolkit (CSAT) envelope command of the type 'Event Download—CSG Cell Selection'. In this case, the CSG ID and the PLMN ID corresponding to the cell may be communicated via the envelope command, or may be communicated separately.

As is known in the art, the 'Event Download—CSG Cell Selection' command includes a plurality of Type Length Values (TLV), which may include one or more of a CSG ID TLV, a CSG cell selection TLV and a H(e)NB name TLV, for communicating information required by UICCs. The CSG cell selection status TLV includes data indicative of CSG cell selection status, the CSG ID TLV includes data indicative of a CSG ID and the H(e)NB name TLV includes data indicative of a name of a corresponding CSG cell.

In cases where the aforementioned PLMN ID corresponding to the CSG cell 80 is communicated via the 'Event Download—CSG Cell Selection' command, the CSG ID TLV, the CSG cell selection TLV or the H(e)NB name TLV may be expanded for communicating the PLMN ID. Alternatively, a TLV may be added to the 'Event Download—CSG Cell Selection' command for communicating the PLMN ID.

An overview of the steps performed by the UICC 20 in response to receiving the aforementioned change notification will now be described with reference to FIG. 4. In response to receiving the aforementioned change notification (step 401), the UICC 20 uses the SIM, USIM, ISIM or CSIM associated with the UE 50 to control access to resources of the CSG cell 80 using the received PLMN ID (step 403). In particular, the UICC 20 invokes one or more applications or applets associated with the received change notification to control access to the resources of the now unambiguously identified CSG cell 80, which may, for example, include establishing or disestablishing a channel with the CSG cell 80, depending on the change notification.

For example, the UICC 20 may access resources of the CSG cell 80 to enable the UE 50 to be served thereby. Alternatively, the UICC 20 may release resources of the CSG cell 80 in response to receiving the change notification, which may, for example, arise because the UE 50 is no longer served by the CSG cell 80 or the UE 50 has left the serving area of the CSG cell 80. For completeness, it is noted that the UICC 20 may alternatively maintain access to resources of CSG cell 80 in response to receiving the change notification, or may monitor an operational state associated with the UE 50 on the basis of the change notification.

As described above, the change notification may be communicated via the aforementioned envelope command of the type 'Event Download—CSG Cell Selection'. In this case, the CSG ID and PLMN ID may be communicated via the 'Event Download—CSG Cell Selection' command, or may be communicated separately.

As described above, the PLMN ID may be communicated via the envelope command of the type 'Event Download—CSG Cell Selection'. In this case, the UICC 20 may be configured to extract the PLMN ID from the relevant one of the CSG ID TLV, the CSG cell selection TLV and the H(e)NB name TLV, and use it to unambiguously identify a PLMN associated with the received CSG ID. The UICC 20 may be additionally configured to extract the CSG ID from the CSG ID TLV and identify a type of the change notification, such as the UE 50 has entered the serving area of a CSG cell, on the basis of data contained in the CSG cell selection status TLV. Thereafter, the UICC 20 may execute one or more applications and applets associated with the identified type of change notification, and pass the extracted CSG ID and the PLMN ID thereto for use in controlling access to resources of the CSG cell 80.

For completeness, it is noted that the UE 50 may communicate the PLMN ID and the CSG ID separately to the change notification. Furthermore, the CSG ID and the PLMN ID may be communicated to the UICC 20 via a further envelope command, such as 'Event Download—Network Rejection' command, which may be for a purpose other than to communicate the change notification, such as for notifying the UICC 20 of the current point of attachment. In this regard, the CSG ID and PLMN ID may be communicated regardless of any changes in the state of association and/or in absence of data indicative of the change notification.

In accordance with an example embodiment, the UE 50 may monitor for a change in a state of association between a further cell, such as the Node B 81, and the UE 50, and in response to a change in the state of association, the UE 50 may communicate data indicative of the change, an identifier associated with the further cell, and an identifier corresponding to a PLMN associated with the further cell for receipt by the UICC 20. Thereafter, the UICC 20 may use an application, such as the SIM, USIM, ISIM or CSIM, associated with the L 50 to control access to resources of the further cell on the basis of the received PLMN ID.

As described above, the change notification in relation to the further cell may be communicated by the UE 50 via the aforementioned envelope command, which may be of the type 'Event Download—CSG Cell Selection'. In which case, one or more of the TLVs included in the envelope command, such as H(e)NB name TLV, may include data indicative of the PLMN ID associated with the further cell, and the UICC 20 may be configured to identify a PLMN associated with the received identifier associated with the further cell on the basis of the data indicative of the PLMN ID contained in the relevant one of the TLVs.

Figure 4:
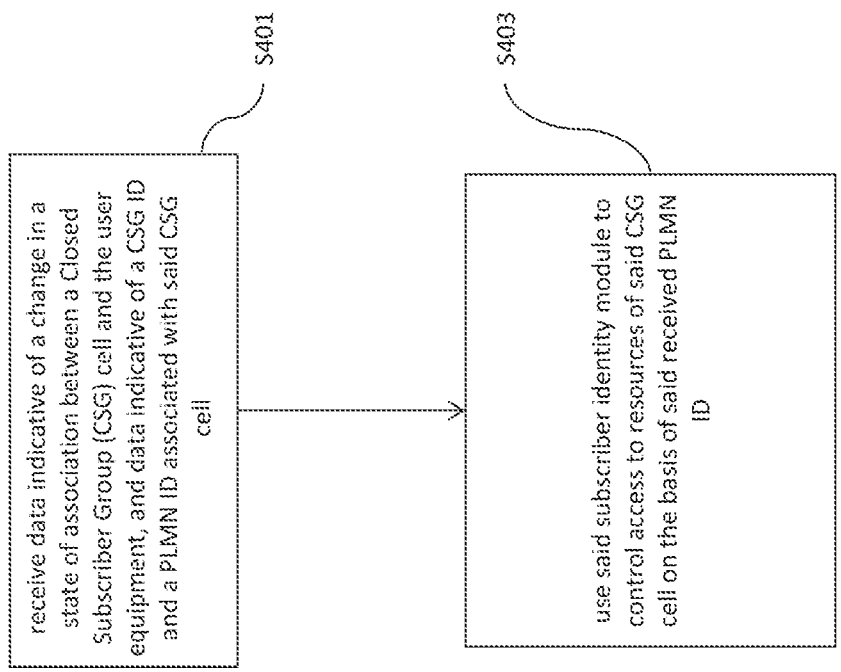
FIG. 4 is a logic flow diagram that illustrates the operation of a method, and a result of execution of computer program instructions embodied on a computer readable memory, from the perspective of a universal integrated data card, according to some embodiments.

FIGS. 2 and 4 represent results from executing a computer program or an implementing algorithm stored in the local memory of the UE 50 and the UICC 20 respectively as well as illustrating the operation of a method and a specific manner in which the processor and memory with computer program/algorithm are configured to cause the UE 50 and the UICC 20 respectively (or one or more components thereof) to operate. The various blocks shown in these Figures may also be considered as a plurality of coupled logic circuit elements constructed to carry out the associated function(s), or specific result or function of strings of computer program code stored in a computer readable memory. Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may include circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 5:
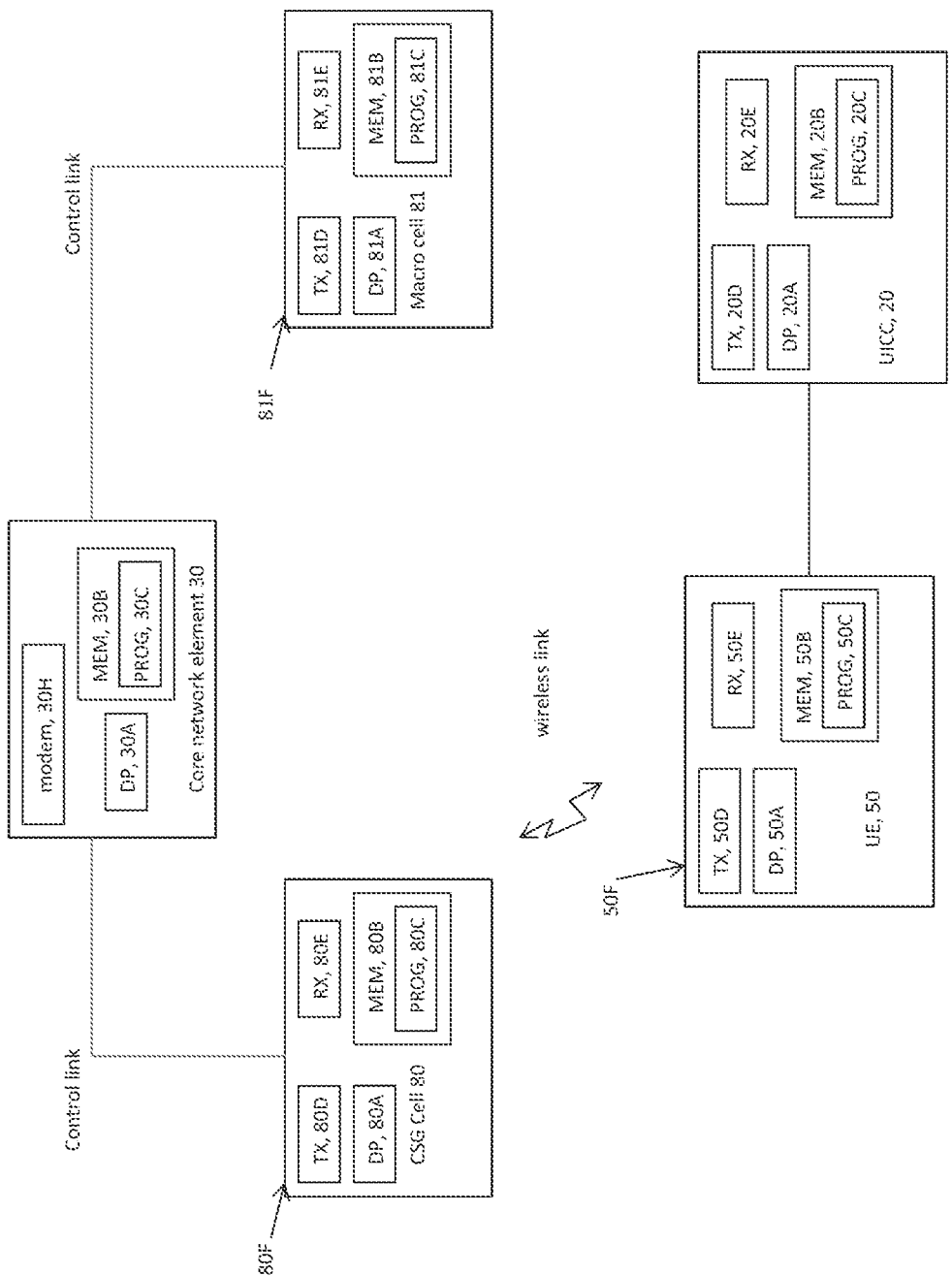
FIG. 5 is a simplified block diagram of various network devices, which are exemplary electronic devices suitable for use in practicing some example embodiments.

Reference is now made to FIG. 5 for illustrating a simplified block diagram of various electronic devices and apparatus that are suitable for use in practicing the exemplary embodiments of this invention. In FIG. 5 a CSG cell 80 and a Node B 81 is adapted for communication over a wireless link with a UE 50, such as a mobile terminal. The Node B 81 and/or the CSG cell 80 may be a macro Node B, an eNodeB, a remote radio head or relay station, or other type of base station/cellular network access node.

The UE 50 include processing means such as at least one data processor (DP) 50A, storing means such as at least one computer-readable memory (MEM) 50B storing at least one computer program (PROG) 50C, and also communicating means such as a transmitter TX 50D and a receiver RX 50E for bidirectional wired or wireless communications with the Node B 80 via, for example, one or more antennas 50F.

The UICC 20 may include its own processing means, such as data processor (DP) 20A, or may utilise data processor 50A of the UE 50. The UICC 20 includes storing means such as at least one computer-readable memory (MEM) 20B for maintaining SIM/USIM/ISIM/CSIM corresponding to the UE 50. The storing means may additionally maintain at least one computer program (PROG) 20C, and may additionally include a transmitter TX 20D and/or a receiver RX 20E for unidirectional or bidirectional communication with the UE 50. The UICC 20 may engage in bidirectional communication with the communication network 10 via the transmitter TX 50D and a receiver RX 50E of the UE 50.

The Node B 81 includes its own processing means such as at least one data processor (DP) 81A, storing means such as at least one computer-readable memory (MEM) 81B storing at least one computer program (PROG) 81C, and communicating means such as a transmitter TX 81D and a receiver RX 81E for bidirectional wireless communications with other devices under its control via one or more antennas 81F. There is a data and/or control path, termed at FIG. 5 as a control link which in the 3GPP cellular system may be implemented as an S1 interface, coupling the Node B 81 with the core network element 30, such as an RNC, and over which the core network element 30 and the Node B 81 may exchange control messages.

Similarly, the CSG cell 80 includes its own processing means such as at least one data processor (DP) 80A, storing means such as at least one computer-readable memory (MEM) 80B storing at least one computer program (PROG) 80C, and communicating means such as a transmitter TX 80D and a receiver RX 80E for bidirectional wireless communications with other devices under its control via one or more antennas 80F. There is a data and/or control path, termed at FIG. 5 as a control link which in the 3GPP cellular system may be implemented as an S1 interface, coupling the CSG cell 80 with the core network element 30, such as an RNC, and over which the core network element 30 and the CSG cell 80 may exchange control messages.

Similarly, the core network element 30, such as an RNC, includes processing means such as at least one data processor (DP) 30A, storing means such as at least one computer-readable memory (MEM) 30B storing at least one computer program (PROG) 30C, and communicating means such as a modem 30H for bidirectional communication with the Node B 81 and the CSG cell 80 over the control link.

While not particularly illustrated for the UE 50, the Node B 81, the CSG cell 80 and the core network element 30, those devices are also assumed to include as part of their wireless communicating means a modem which may be inbuilt on a radiofrequency RE front end chip within those devices 50, 81, 80, 30 and which chip also carries the TX 50D/81D/80D/30D and the RX 50E/81E/80E/30E.

At least one of the PROGs 50C in the UE 50 is assumed to include program instructions that, when executed by the associated DP 50A, enable the device to operate in accordance with the exemplary embodiments of this invention, as detailed above. The UICC 20 also has software stored in its MEM 20B to implement certain aspects of these teachings. In these regards the exemplary embodiments of this invention may be implemented at least in part by computer software stored on the MEM 50B, 20B which is executable by the DP 50A of the UE 50 and/or DP 20A of the UICC 20, or by hardware, or by a combination of tangibly stored software and hardware (and tangibly stored firmware). Electronic devices implementing these aspects of the invention need not be the entire devices as depicted at FIG. 5, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 50B and 20B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 50A and/or 20A include but are not limited to general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus for a user equipment, the apparatus comprising:
   at least one processor; and
   at least one memory including computer program code, the at least one memory and the computer code, being configured to, with the at least one processor, cause the apparatus at least to:
   monitor for a change in a state of association between a Closed Subscriber Group (CSG) cell and the user equipment, said CSG cell having a Public Land Mobile Network Identity (PLMN ID) and a CSG Identity (CSG ID) associated therewith; and
   in response to a said change, communicate data indicative of the change, and of said CSG ID and said PLMN ID, for receipt by a Universal Integrated Circuit Card (UICC) associated with the user equipment, whereby to enable the UICC to control access to resources of said CSG cell,
   wherein said data indicative of said CSG ID and said PLMN ID are communicated via an envelope command of the type 'Event Download—CSG Cell Selection'.

2. The apparatus according to claim 1, wherein said envelope command comprises one of:
   a CSG ID Type Length Value (TLV), and said CSG ID TLV comprises data indicative of said PLMN ID;
   a CSG cell selection status Type Length Value (TLV), and said CSG cell selection status TLV comprises data indicative of said PLMN ID;
   a Home (e)Node B (H(e)NB) name Type Length Value (TLV), and said H(e)NB name TLV comprises data indicative of said PLMN ID; and
   a Type Length Value (TLV) for communicating data indicative of said PLMN ID.

3. The apparatus according to claim 1, wherein the change in the state of association comprises one of:
   the user equipment has entered a serving area of the CSG cell;
   the user equipment has left the serving area of the CSG cell;
   the user equipment has registered with the CSG cell;
   the user equipment has been rejected for service in the CSG cell;
   the user equipment is being served by the CSG cell; and
   the user equipment is camped on the CSG cell.

4. The apparatus according to claim 1, wherein the apparatus comprises a modem.

5. The apparatus according to claim 4, wherein the modem is adapted to receive data relating to said CSG cell via any one of:
   a GSM EDGE Radio Access Network (GERAN);
   a Universal Terrestrial Radio Access Network (UTRAN); and
   a Enhanced Universal Terrestrial Radio Access Network (E-UTRAN).

6. A method of controlling access to resources of a communication network by a user equipment, the method comprising causing the user equipment to:
   monitor for a change in a state of association between a Closed Subscriber Group (CSG) cell and the user equipment, said CSG cell having a Public Land Mobile Network Identity (PLMN ID) and a CSG Identity (CSG ID) associated therewith; and
   in response to a said change, communicate data indicative of the change, and of said CSG ID and said PLMN ID, for receipt by a Universal Integrated Circuit Card (UICC) associated with the user equipment, whereby to enable the UICC to control access to resources of said CSG cell,
   wherein said data indicative of said CSG ID and said PLMN ID are communicated via an envelope command of the type 'Event Download—CSG Cell Selection'.

7. The method according to claim 6, wherein said envelope command comprises one of:
   a CSG ID Type Length Value (TLV), and said CSG ID TLV comprises data indicative of said PLMN ID;
   a CSG cell selection status TLV, and said CSG cell selection status TLV comprises data indicative of said PLMN ID;
   a Home (e)Node B (H(e)NB) name TLV, and said H(e)NB name TLV comprises data indicative of said PLMN ID; and
   a Type Length Value (TLV) for communicating data indicative of said PLMN ID.

8. The method according to claim 6, wherein the change in the state of association comprises one of:
   the user equipment has entered a serving area of the CSG cell;
   the user equipment has left the serving area of the CSG cell;
   the user equipment is being served by the CSG cell; and
   the user equipment is camped on the CSG cell.

9. An apparatus, comprising:
   a subscriber identity module associated with a user equipment;
   at least one processor; and
   at least one memory including computer program code, the at least one memory and the computer code, being configured to, with the at least one processor, cause the apparatus at least to:
   receive data indicative of a change in a state of association between a Closed Subscriber Group (CSG) cell and the user equipment, and data indicative of a CSG ID and a Public Land Mobile Network Identity (PLMN) ID associated with said CSG cell, wherein said data indicative of a CSG ID and a PLMN ID associated with said CSG cell are received in an envelope command of the type 'Event Download—CSG Cell Selection'; and
   use said subscriber identity module to control access to resources of said CSG cell on the basis of said received PLMN ID.

10. The apparatus according to claim 9, wherein the at least one memory and the computer code are configured to, with the at least one processor, cause the subscriber identity module to access the resources of the CSG cell.

11. The apparatus according to claim 9, wherein the at least one memory and the computer code are configured to, with the at least one processor, cause the subscriber identity module to release resources of the CSG cell.

12. The apparatus according to claim 9, wherein said envelope command comprises one of:
- a CSG ID Type Length Value (TLV), said CSG ID TLV comprising data indicative of said CSG ID and said PLMN ID, and wherein the at least one memory and the computer code are configured to, with the at least one processor, cause the apparatus to identify a PLMN associated with the received CSG ID on the basis of data contained in the CSG ID TLV;
- a CSG cell selection status TLV and a CSG ID TLV, said CSG cell selection status TLV comprising data indicative of said PLMN ID, and wherein the at least one memory and the computer code are configured to, with the at least one processor, cause the apparatus to identify a PLMN associated with the received CSG ID on the basis of data contained in the CSG cell selection status TLV;
- a Home (e)Node B (H(e)NB) name TLV and a CSG ID TLV, said H(e)NB name TLV comprising data indicative of said PLMN ID, and wherein the at least one memory and the computer code are configured to, with the at least one processor, cause the apparatus to identify a PLMN associated with the received CSG ID on the basis of data contained in the H(e)NB name TLV; and
- a Type Length Value (TLV) for communicating data indicative of said PLMN ID, and wherein the at least one memory and the computer code are configured to, with the at least one processor, cause the apparatus to identify a PLMN associated with the received CSG ID on the basis of data contained in the TLV.

13. A universal integrated circuit card comprising an apparatus according to claim 9.

14. A method, comprising:
receiving data indicative of a change in a state of association between a Closed Subscriber Group (CSG) cell and a user equipment, and data indicative of a CSG ID and a Public Land Mobile Network Identity (PLMN) ID associated with said CSG cell, wherein said data indicative of a CSG ID and a PLMN ID associated with said CSG cell are received in an envelope command of the type 'Event Download—CSG Cell Selection'; and
using a subscriber identity module associated with said user equipment to control access to resources of said CSG cell on the basis of said received PLMN ID.

15. The method according to claim 14, in which the method comprises using said subscriber identity module to access the resources of the CSG cell.

16. The method according to claim 14, in which the method comprises using said subscriber identity module to release resources of the CSG cell.

17. The method according to claim 14, in which the method comprises:
receiving a CSG ID Type Length Value (TLV) via said envelope command, said CSG ID TLV comprising data indicative of said CSG ID and said PLMN ID; and
identifying a PLMN associated with the received CSG ID on the basis of data contained in the CSG ID TLV.

18. The method according to claim 14, in which the method comprises:
receiving a CSG cell selection status TLV via said envelope command, said CSG cell selection status TLV comprising data indicative of said PLMN ID; and
identifying a PLMN associated with the received CSG ID on the basis of data contained in the CSG cell selection status TLV.

19. The method according to claim 14, in which the method comprises:
receiving a Home (e)Node B (H(e)NB) name TLV via said envelope command, said H(e)NB name TLV comprising data indicative of said PLMN ID; and
identifying a PLMN associated with the received CSG ID on the basis of data contained in the H(e)NB name TLV.

20. The method according to claim 14, in which the method comprises:
receiving a TLV included in said envelope command, said TLV being for communicating data indicative of said PLMN ID; and
identifying a PLMN associated with the received CSG ID on the basis of data contained in the TLV.

* * * * *